Figure 1:
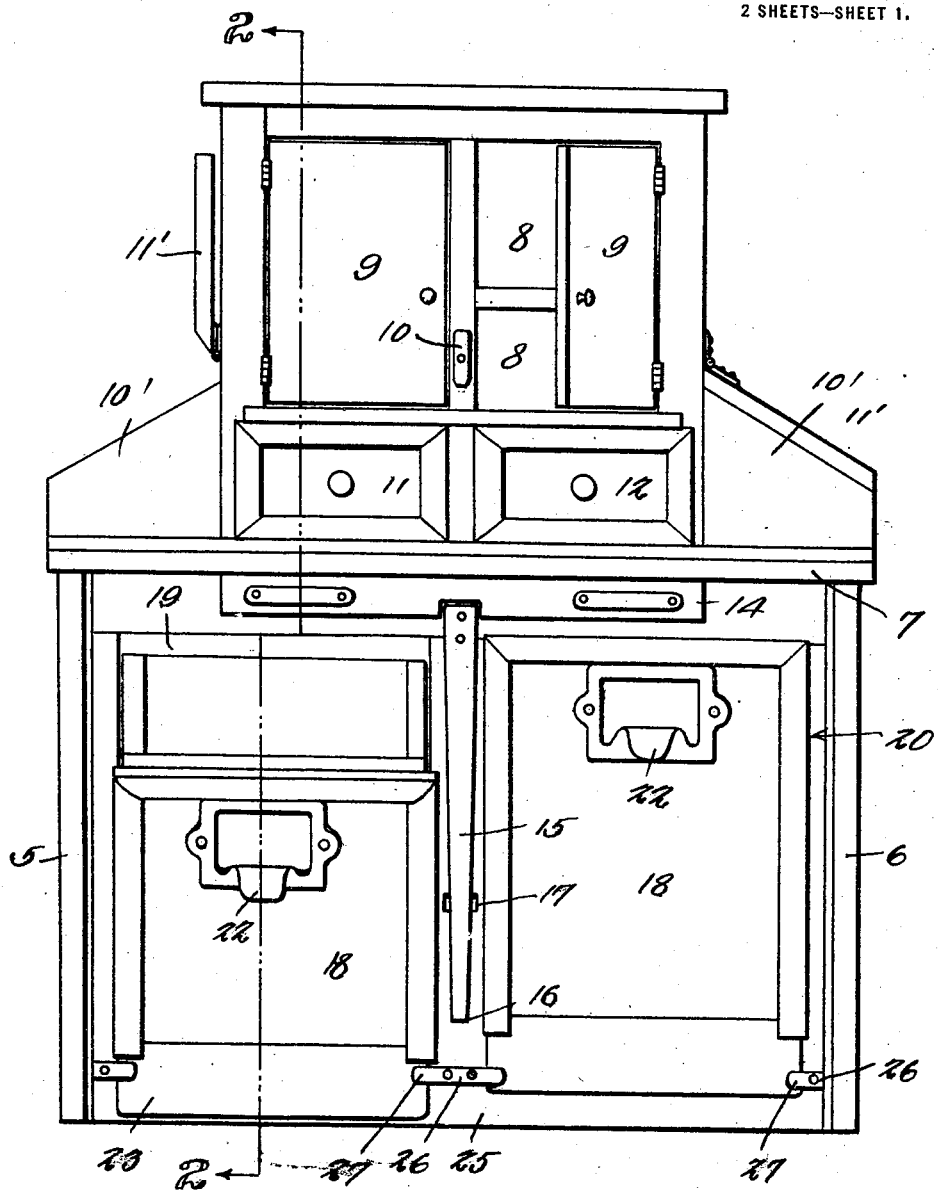

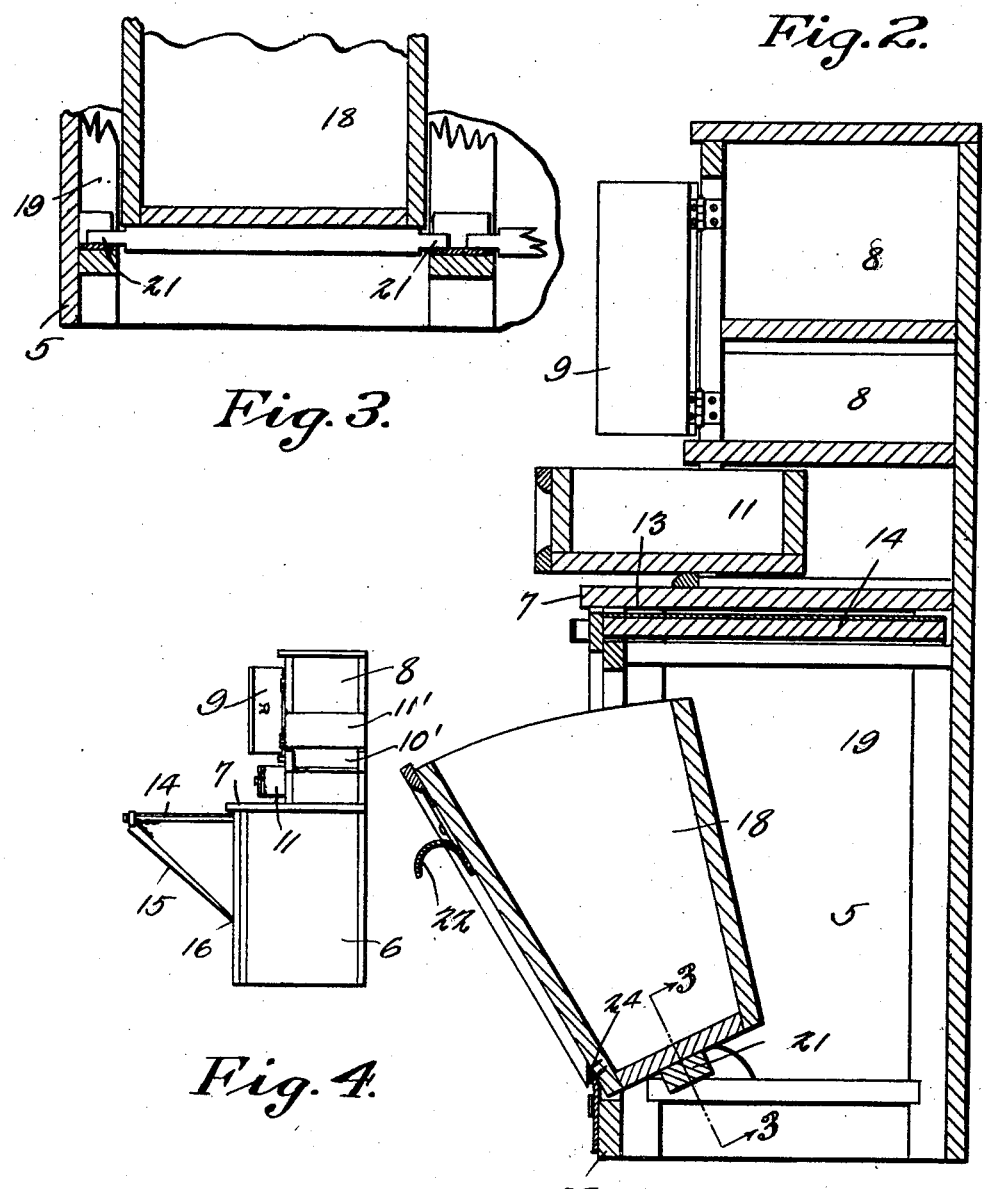

UNITED STATES PATENT OFFICE.

BENJAMIN F. LITTLE, OF CORDELE, GEORGIA.

KITCHEN-CABINET.

1,316,489.

Specification of Letters Patent. Patented Sept. 16, 1919.

Application filed July 15, 1919. Serial No. 311,035.

*To all whom it may concern:*

Be it known that I, BENJAMIN F. LITTLE, a citizen of the United States, residing at Cordele, in the county of Crisp and State of Georgia, have invented a new and useful Kitchen-Cabinet, of which the following is a specification.

This invention relates to improvements in furniture, and more particularly to kitchen cabinets, the main object of the invention being to provide a device of this character having suitable bins and compartments to provide convenient means for the efficient arrangement of flour, spices, and other articles necessary in culinary operations.

A further object of the invention is to provide means for guarding the lower portions of the bins to prevent the entrance of dust or pests.

A further object of the invention is to pivot the flour bins in such a manner that they will be easily moved to their open position, and held in their open position by their own weight.

A still further object of the invention is to provide a kneading board or table which will normally be held out of sight, but which may be readily brought into operation.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Referring now to the drawings:—

Figure 1. illustrates a front elevational view of a kitchen cabinet constructed in accordance with my invention;

Fig. 2. illustrates a vertical sectional view taken on line 2—2 of Fig. 1;

Fig. 3. is a detail view of the pivots forming the supports for the bins; and

Fig. 4 is a side elevational view with the kneading board in its extended position.

Reference being had to the drawing in detail;

The cabinet includes the main or body portion having side walls 5 and 6 and a top 7 which as shown, supports the upper portion of the cabinet which includes upper compartments, 8 closed by hinged doors 9, which doors may be held in their closed position by means of the rotary button 10, connected to the frame of the upper portion of the cabinet. Lateral compartments 10' are provided adjacent the upper portion of the cabinet, and are closed by suitable hinged closures 11'.

Disposed directly under the doors 9 are provided suitable sliding drawers 11 and 12, said drawers, when open being in such position that they rest on the top 7 of the lower portion of the cabinet.

Located directly under the top 7 is a suitable opening 13 adapted to receive the kneading board or table 14, which is provided with a leg 15 hingedly connected at one of its ends to the under side of the table 14, the opposite end of said leg 15 being beveled as at 16 to fit into the notch 17 formed in the front wall of the cabinet. Bins 18 which are substantially triangular in cross section, are pivoted within the openings 19 and 20 provided in the front wall of the body of the cabinet, and it will be seen that due to the location of the pivots 21—the bins will be tilted forward, by a slight pull on the hand grips 22 provided on the fronts of the bins.

Adjacent the lower edge of each of the bins 18 is a movable metal guard 23, which has its upper edge pivotally connected to the bin, by means of staples 24, the lower edge thereof lying in close engagement with the strip 25 secured to the lower edge of the front of the cabinet.

Guide fingers 26 are secured to the strip 25, and have portions 27 overlying the edges of the guards 23 for holding the guards in position at all times, and at the same time permit of sliding movement of the guards 23.

From the foregoing it will be seen that the lower portions of the bins 18 are guarded at all times against entrance by insects or other pests.

What is claimed is:

1. In a guard for bins, guide ways formed on the lower portion of the bin, a metallic plate operating between the guide ways, said metallic plate adapted to move between the guideways when the bin is operated.

2. In combination with a bin having a hinged container, a guard including a metallic plate, means for hingedly connecting the upper end of the guard to the hinged container, adjacent the lower end thereof, guide ways formed on the bin, and said plate adapted to move in the guide ways, when the hinged container is operated.

In testimony that I claim the foregoing as my own, I have hereto affixed my signature in the presence of two witnesses.

BENJAMIN F. LITTLE.

Witnesses:
ED PERRY,
J. W. SPIRES.